DE WITT C. TELLER.
Improvement in Water Wheels.

No. 121,137.  Patented Nov. 21, 1871.

Witnesses
Gustave Dieterich
Francis McArdle

Inventor:
De Witt C. Teller
PER Munn &c
Attorneys

AM. PHOTO-LITHOGRAPHIC CO. N.Y. (OSBORNE'S PROCESS.)

UNITED STATES PATENT OFFICE.

DE WITT C. TELLER, OF FORT PLAINS, NEW YORK.

IMPROVEMENT IN WATER-WHEELS.

Specification forming part of Letters Patent No. 121,137, dated November 21, 1871.

*To all whom it may concern:*

Be it known that I, DE WITT C. TELLER, of Fort Plains, in the county of Montgomery and State of New York, have invented a new and useful Improvement in Turbine Water-Wheels; and I do hereby declare that the following is a full, clear, and exact description thereof, which will enable others skilled in the art to make and use the same, reference being had to the accompanying drawing forming part of this specification.

Figure 1:
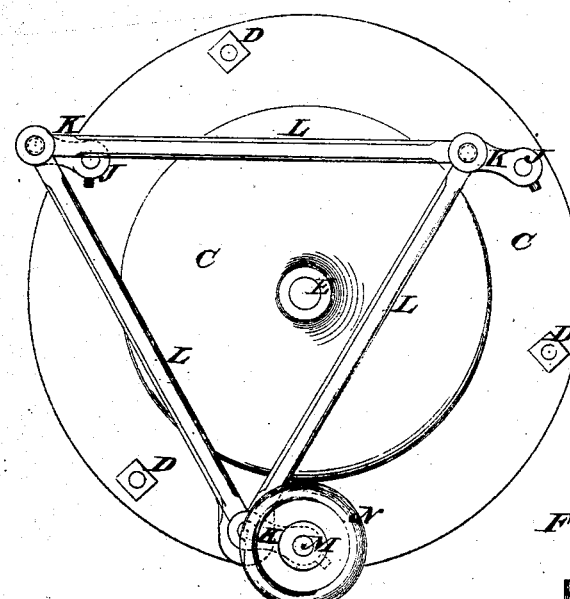
Figure 2:
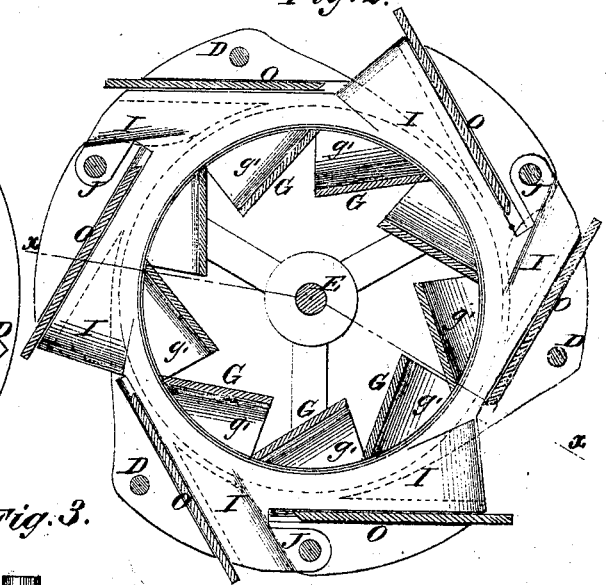
Figure 3:
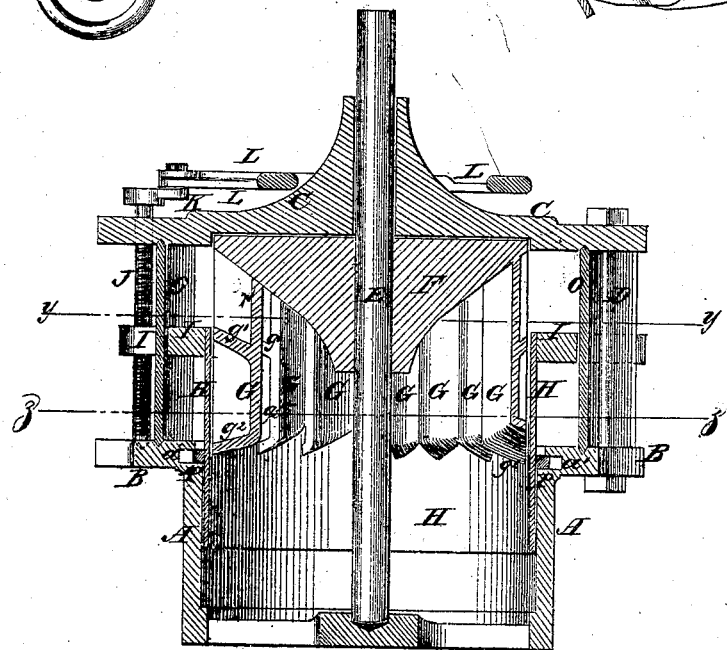
Figure 4:
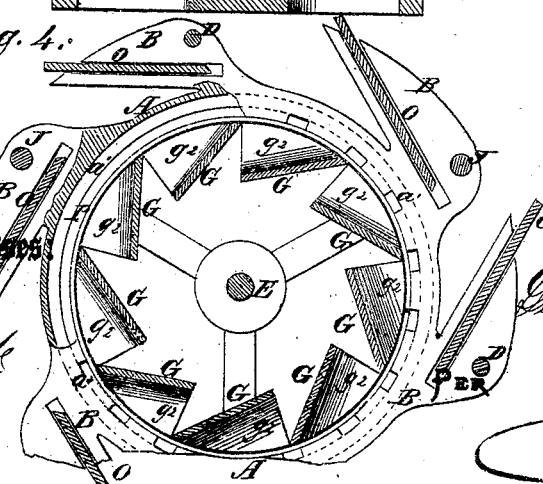

Figure 1 is a top view of my improved water-wheel. Fig. 2 is a detail horizontal section of the same taken through the line $y\ y$, Fig. 3. Fig. 3 is a detail vertical section of the same taken through the line $x\ x$, Fig. 2. Fig. 4 is a detail horizontal section of the same taken through the line $z\ z$, Fig. 3.

Similar letters of reference indicate corresponding parts.

My invention has for its object to furnish an improved turbine water-wheel, simple in construction, easily adjusted, and effective in operation, utilizing a very large per cent. of the power of the water; and it consists in the construction and combination of various parts of the wheel, as hereinafter more fully described.

A is the case, which is set in and secured to the bottom of the flume, and around the upper edge of which is formed an outwardly-projecting flange, B. C is the cap-plate, which is connected with the flange B of the case A, and supported at a proper distance above said flange by long bolts D, as shown in Fig. 3. E is the shaft, to which the wheel is attached, and which is supported in the ordinary manner. F is a disk or plate, through the center of which passes, and which is secured to, the shaft E, and the lower side of which is made conical, as shown in Fig. 3. To the lower side of the disk F, around its outer edge, are attached, or upon it are formed the buckets G, which incline inwardly and rearwardly, as shown in Figs. 2 and 4. Upon the middle part of the buckets G are formed outwardly-projecting flanges $g'$, which incline inward and downward, and the outer edges of which are curved to correspond with the curvature of the cylindrical gate. Upon the lower edges of the buckets G are formed a similar set of flanges, $g^2$. H is the gate, which is made in the form of a hollow cylinder, and fits into the space between the wheel F, G, and the case A. Around the upper edge of the gate H is formed a flange, I, which is notched, as shown in Figs. 2 and 3, to receive the guide-boards or plates. The gate H is raised and lowered to regulate the amount of water admitted to the wheel F G by means of the screws J—three or more—which pass through screw-holes in the outer parts of the flange I of the said gate H, and are swiveled to the flange B of the case A, and to the cap-plate C. To the upper ends of the swiveled screws J, which projects above the said cap-plate C, are securely attached short cranks K, which are connected by a frame or bars, L, so that they may all move together. With one of the cranks K is connected a rod or shaft, M, which projects upward, and with the upper end of which is connected a hand-wheel, crank, or lever, N, as shown in Fig. 1, so that the gate H may be conveniently raised and lowered by operating the said hand-wheel. O are the guide-boards or plates, the lower edges of which are secured to the upper side of the flange B of the case A, and their upper edges are secured to the lower side of the cap-plate C, and which enters the notches in the flange I of the gate H.

The boards or plates O are made short, so that the outer end of the one board or plate will not overlap the inner end of the next adjacent board or plate, a space being left between said edges for the water to pass directly to the wheel. The flange B of the case A is notched along the inner sides of the guides O, as shown in Fig. 4. By this construction the water is allowed to have a free passage to and from the wheels; and should any sticks or other obstructions enter and lodge in the wheel, a few upward and downward movements of the gate will dislodge them, and cause them to pass through the wheel. In the inner surface of the upper part of the case A is formed a groove or channel, $a'$, in the outer part or mouth of which is placed a leather, rubber, or other suitable packing, P. The upper edge of the case A is notched or perforated, as shown in Figs. 3 and 4, so that the water can pass into the inner part of the channel or groove $a'$ at the rear of the packing P, and by its pressure hold the said packing out against the outer surface of the gate H, and thus prevent the escape of water between the said case A and gate H.

A very important part of my invention consists in shortening the guide-plates to prevent the outer end of one overlapping the inner end of the other. By this construction the water enters the wheels without passing over the outside of the guide-plates, and its pressure, while changing its direction to escape, is brought full upon the buckets and under the guides.

Having thus described my invention, I claim as new and desire to secure by Letters Patent—

1. The combination, with flanges I, of swiveled screws J, short cranks K, frame L, shaft M, and lever N, as a new means of adjusting vertically the gate of a turbine-wheel.

2. The combination, with notched flanges I, of the gate, and notched flange B, of guide-boards O, arranged in said notches at a tangent to a circle larger than but concentric with the wheel, and so as not to overlap each other, whereby the water is allowed a free passage to and from the wheel, and temporary obstructions readily removed.

3. The arrangement of the packing P, in connection with the grooved or channeled case A and gate H to adapt it to be held out against the said gate H by the pressure of the water, substantially as herein shown and described, and for the purpose set forth.

The above specification of my invention signed by me this 11th day of August, 1871.

DE WITT C. TELLER.

Witnesses:
   JAMES T. GRAHAM,
   GEO. W. MABEE.

(168)